United States Patent [19]

Dierdorf et al.

[11] Patent Number: 4,910,244

[45] Date of Patent: Mar. 20, 1990

[54] STORABLE ADHESIVE CONTAINING POST-CHLORINATED PVC

[75] Inventors: Hans R. Dierdorf, Langenfeld; Juergen Wegner, Duesseldorf, both of Fed. Rep. of Germany

[73] Assignee: Henkel Kommanditgesellschaft auf Aktien, Dusseldorf-Holthausen, Fed. Rep. of Germany

[21] Appl. No.: 267,902

[22] Filed: Nov. 7, 1988

[30] Foreign Application Priority Data

Nov. 9, 1987 [DE] Fed. Rep. of Germany ....... 3738060

[51] Int. Cl.$^4$ ............................ C08K 3/26; C08K 5/57
[52] U.S. Cl. ..................................... 524/179; 524/178
[58] Field of Search ............................... 524/179, 178

[56] References Cited

U.S. PATENT DOCUMENTS

| | | | |
|---|---|---|---|
| 2,954,362 | 9/1960 | Wilson | 524/178 |
| 3,726,826 | 4/1973 | Knight | 524/113 |
| 4,515,917 | 5/1985 | Yamamoto et al. | 524/178 |
| 4,711,921 | 12/1987 | Lehr | 524/180 |
| 4,780,497 | 10/1988 | Lehr | 524/424 |
| 4,786,662 | 11/1988 | DeBerraly et al. | 524/406 |

Primary Examiner—Joseph L. Schofer
Assistant Examiner—John J. Guarriello
Attorney, Agent, or Firm—Ernest G. Szoke; Wayne C. Jaeschke; Daniel S. Ortiz

[57] ABSTRACT

A storage stable adhesive for PVC plastics, particularly post-chlorinated PVC plastics, containing a basic mixture of 5 to 30% by weight post-chlorinated PVC and 95 to 70% by weight of an organic solvent, a stabilizer combination of effective quantities of organotin compounds and alkali metal carbonates from the group consisting of ammonium, lithium, sodium and potassium carbonates and also standard additives, such as impact modifiers, antioxidants and UV stabilizers can be included in the basic mixture. The composition has improved stability when stored in tin plated steel containers.

9 Claims, 5 Drawing Sheets

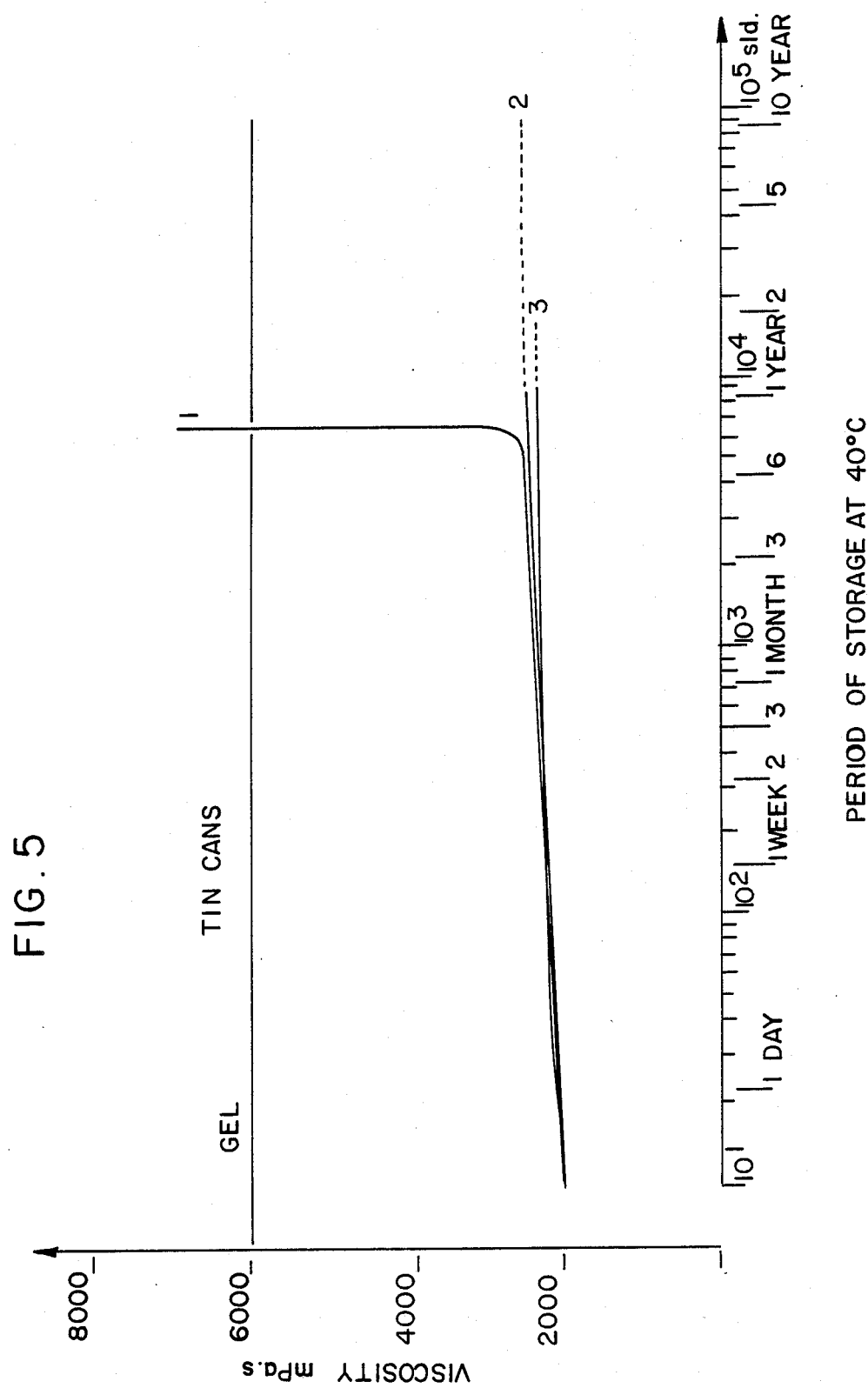

STORABLE ADHESIVE CONTAINING POST-CHLORINATED PVC

BACKGROUND OF THE INVENTION

1. Field of the Invention

The invention is a storable adhesive for PVC plastics, particularly post-chlorinated PVC plastics.

2 Background of the Invention

Pipes and fittings of post-chlorinated PVC are used for applications where, in addition to high internal pressures of up to 4 bars, temperatures in the range from 60° to 95° C. are encountered. Known adhesives for pipes and fittings of post chlorinated PVC contain between 10 and 30% by weight postchlorinated PVC having a suitable K-value and chlorine content as a binder in combination with suitable, solvents, such as tetrahydrofuran, cyclohexanone, methyl ethyl ketone, N-methylpyrrolidone, methylene chloride, acetone, ethyl acetate and the like. The adhesive can contain consistency-generating constituents such as thickeners, thixotropic agents and the like.

One of the properties, typical of post-chlorinated PVC adhesives is that, depending on the storage temperature, they give off chlorine by a process which is not fully understood and which, due to the inevitable presence of moisture in the adhesive (for example as a result of impurities in the solvent), can lead to container corrosion through the formation of hydrogen chloride. In order to store adhesives containing post-chlorinated PVC for prolonged periods without any risk of corrosion, the adhesives are preferably stored in containers of materials which withstand the chemical attack of hydrogen chloride as a result of suitable measures or by virtue of their chemical composition. Such containers include, in particular, glass vessels, polyolefin-coated metal vessels or containers of aluminum alloys. Unfortunately, containers such as these are either difficult to handle or add considerably to the cost of the adhesives.

Where standard containers based on internally tin-plated steel are used for the adhesives, gradual gelation of the adhesive is unavoidable through the introduction of iron ions, in particular at the location of soldering of the can seam in the vicinity of the flange.

The present invention is an adhesive, containing post-chlorinated PVC, which is stable in storage, even in internally tin-plated steel containers, without substantial loss of adhesive properties.

BRIEF DESCRIPTION OF THE INVENTION

Other than in the operating examples, or where otherwise indicated, all numbers expressing quantities of ingredients or reaction conditions used herein are to be understood as modified in all instances by the term "about".

According to the invention a storable adhesive comprises: a basic mixture of 5 to 30% by weight post-chlorinated PVC and 95 to 70% by weight of an organic solvent, a stabilizing amount of a combination of at least one organotin compound and at least one carbonate from the group consisting of ammonium, lithium, sodium and potassium carbonates. The storable adhesives, can also contain effective amounts of additives such as impact modifiers, antioxidants, UV stabilizers, and the like.

BRIEF DESCRIPTION OF THE DRAWINGS

FIG. 5 is a graph showing the change in viscosity of an adhesive containing post-chlorinated PVC stabilized with a combination of dibutyl tin carboxylate and potassium carbonate.

DETAILED DESCRIPTION OF THE INVENTION

Figure 1:
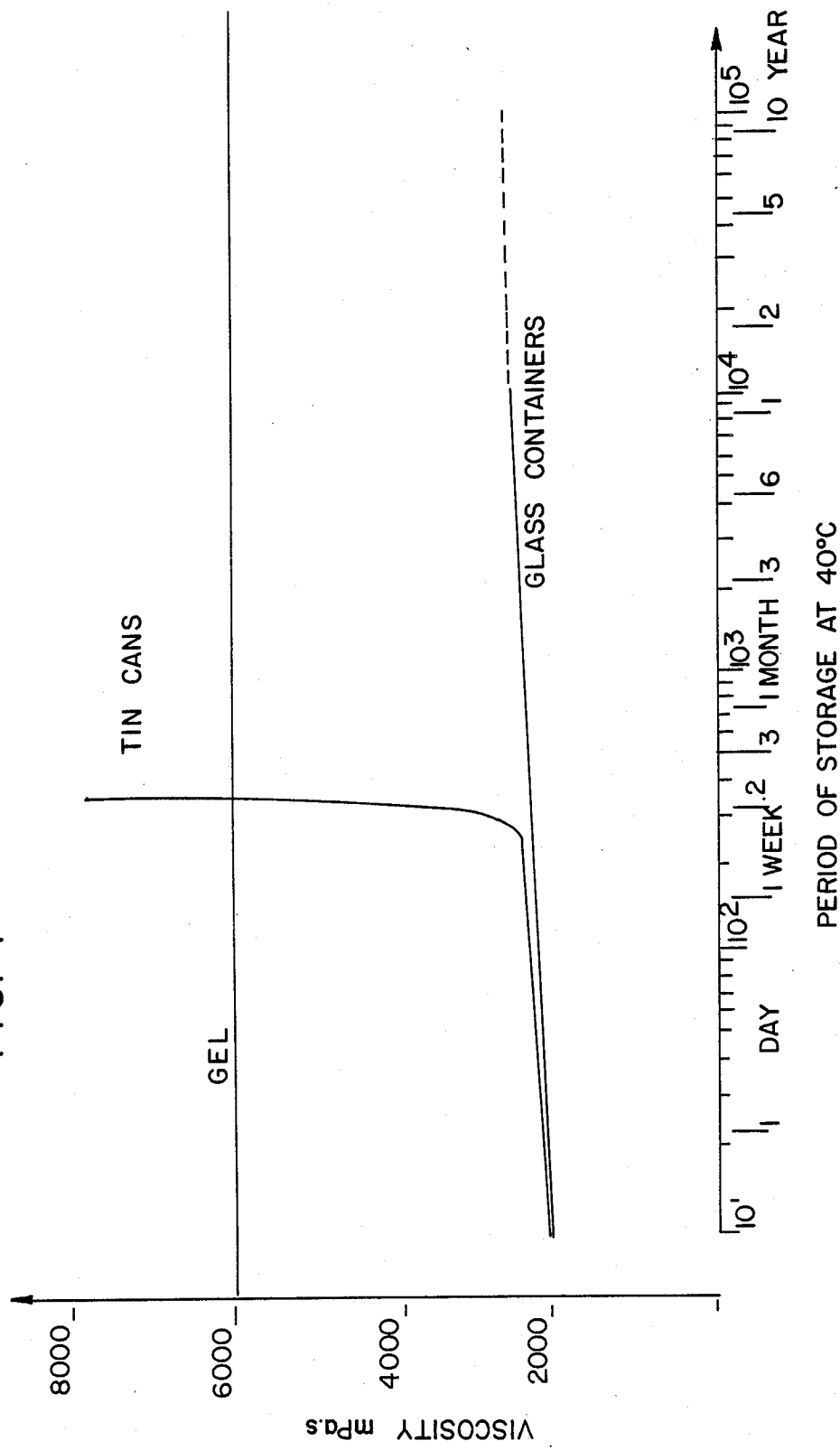
FIG. 1 is a graph showing the change in viscosity, of an adhesive composition containing post-chlorinated PVC with stabilizer, stored in a tin plated steel container.

Suitable organic solvents are the organic solvents known from the prior art, for dissolving post-chlorinated PVC such as N-methylpyrrolidone, dimethylformamide, dichloromethane, methyl isobutyl ketone, acetone, ethyl acetate or the like. The solvents can be used either individually or in admixture. Preferably the organic solvents are from the group consisting of ketones and cyclic ethers. Organic solvents from the group consisting of tetrahydrofuran, methyl ethyl ketone and cyclohexanone are particularly preferred.

The basic mixture of the storable adhesive of the invention preferably contains post-chlorinated PVC having a chlorine content of 65 to 68% by weight and a K-value of 50 to 69.

The organotin compounds suitable for use in accordance with the invention are the compounds known from the corrosion prevention field, preferably alkylated tin (IV) compounds functionalized with organic acid, mercapto, thio acid and thioester groups. Preferred organotin compounds are those from the group consisting of di-n-octyl tin dimercaptide, dibutyl tin dithioesters, di-n-octyl tin dithioglycolate, dibutyl tin dilaurate, di-n-octyltin maleate, dibutyl tin maleate, dibutyl tin carboxylate and dibutyl tin dithioglycolate.

The storage stable adhesives of the invention preferably contain from 1 to 10% by weight of the stabilizer combination, based on the weight of the post-chlorinated PVC present in the adhesive, for an assumed chlorine elimination rate of 5% by weight per year. If the actual chlorine elimination rate of the post-chlorinated PVC differs from the above-mentioned value, the quantity of stabilizer combination to be added may readily be determined. The stabilizer combination in turn contains the carbonates and organotin compounds in a ratio by weight of about 1.5 to 2.5:1.

The invention is illustrated by the following Examples in conjunction with the accompanying drawings. In the Examples, PVC-C stands for post-chlorinated PVC. The acrylate modifier used in the Examples is a product based on polymethyl methacrylate which is commercially available as an impact modifier for PVC plastics, for example a PARALOID ® K12ON, a product of Rohm & Haas Inc.

In the examples, the percentages are by weight unless otherwise noted.

EXAMPLE 1

10% PVC-C, K value 57, Cl content 68%
66% tetrahydrofuran
15% methyl ethyl ketone
4.5% cyclohexanone
2% pyrogenic silica
1.7% acrylate modifier
0.3% dibutyl tin carboxylate [1]
0.5% sodium carbonate

[1] A commercial product not specified in detail by the manufacturer

EXAMPLE 2

20% PVC-C, K value 57, Cl content 68%
56% tetrahydrofuran
17.5% methyl ethyl ketone
2.0% cyclohexanone
2% pyrogenic silica
1.7% acrylate modifier
0.3% dibutyl tin carboxylate
0.5% sodium carbonate

EXAMPLE 3

20% PVC-C, K value 57, Cl content 68%
60% tetrahydrofuran
15% methyl ethyl ketone
2.5% pyrogenic silica
1.7% acrylate modifier
0.3% dibutyl tin dilaurate
0.5% sodium carbonate

EXAMPLE 4

20.0% PVC-C, K value 57, Cl content 68%
75.5% tetrahyrdofuran
2.0% pyrogenic silica
1.7% acrylate modifier
0.3% dibutyl tin dilaurate
0.5% sodium carbonate

EXAMPLE 5

20% PVC-C, K value 69, Cl content 67%
60% tetrahydrofuran
17% methyl ethyl ketone
1.2% pyrogenic silica
1% acrylate modifier
0.3% di-n-octyl tin dimercaptide
0.5% sodium carbonate

EXAMPLE 6

20% PVC-C, K value 69, Cl content 67%
60% tetrahydrofuran
14% methyl ethyl ketone
1.2% pyrogenic silica
4% acrylate modifier
0.3% di-n-octyl tin dimercaptide
0.5% sodium carbonate

EXAMPLE 7

10% PVC-C, K value 66, Cl content 67%
70% tetrahydrofuran
17% methyl ethyl ketone
1.6% pyrogenic silica
1% acrylate modifier
0.15% di-n-octyl tin dimercaptide
0.25% sodium carbonate

EXAMPLE 8

10% PVC-C, K value 66, Cl content 67%
70% tetrahydrofuran
17% methyl ethyl ketone
1.6% pyrogenic silica
4% acrylate modifier
0.15% di-n-octyl tin dimercaptide
0.25% sodium carbonate

COMPARISON EXAMPLE

An adhesive of the following composition was prepared for comparison purposes—without addition of the components of the stabilizer combination:

20% PVC-C, K value 57, Cl content 68%
60.5% tetrahydrofuran
17.5% methyl ethyl ketone
2% cyclohexanone The properties of the comparison formulation were compared with those of Example 2. The results are explained in the following description and also in FIGS. 1 to 5.

If an adhesive corresponding to the comparison formulation is stored in standard glass (Pyrex) or tin plated steel containers at 40 C. in a drying cabinet, the relations shown in FIG. 1 are obtained in regard to stability in storage. Gelation occurred after storage for only 2 weeks in the tin plated steel container.

Figure 2:
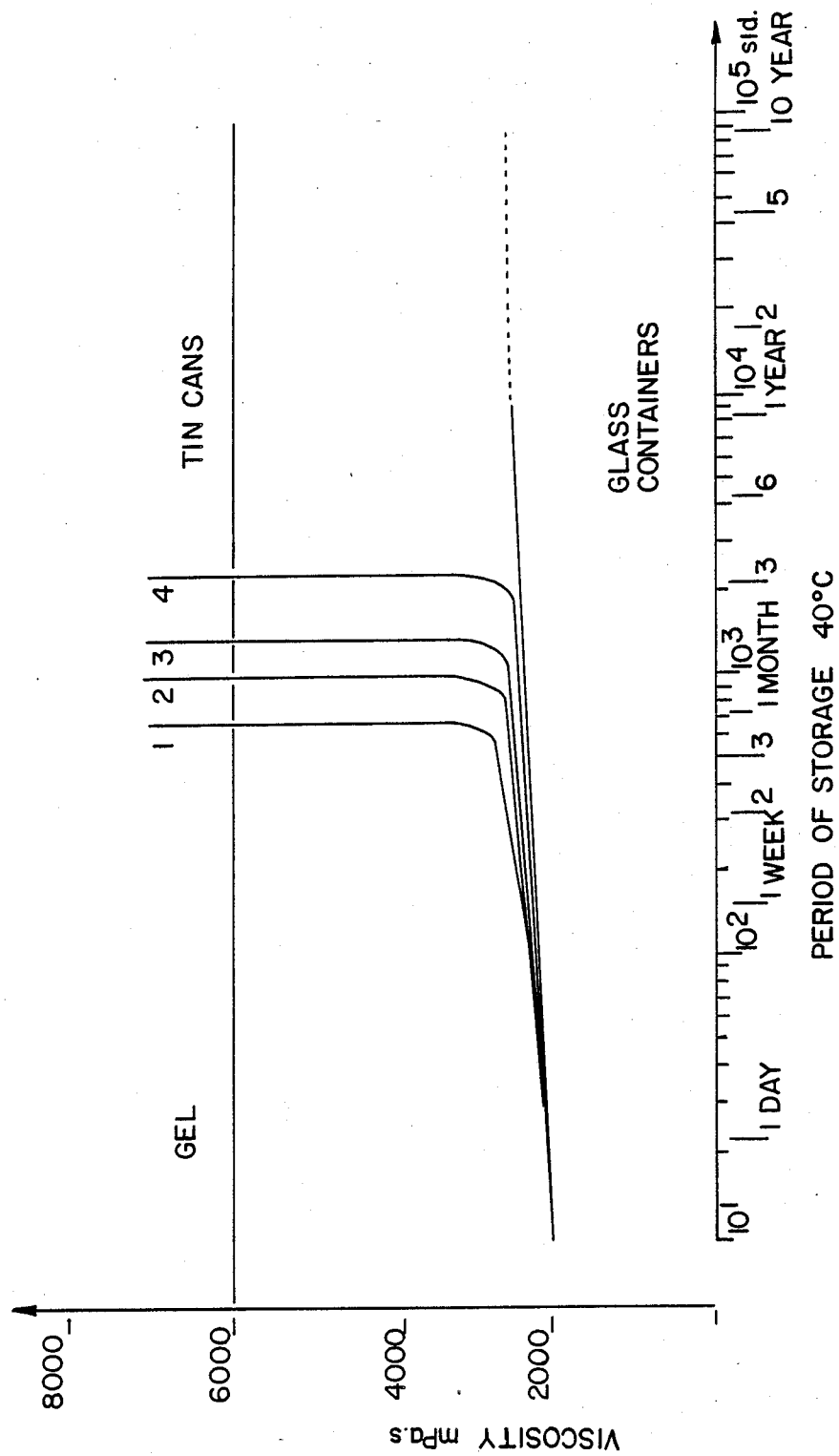
FIG. 2 is a graph showing the change in viscosity of an adhesive containing post-chlorinated PVC stabilized with tin compounds stored in tin plated steel containers.

FIG. 2 shows the stability in storage obtained when di-n-octyl tin mercaptdie (curve 1), organotin salts (mixture of 0.15% by weight dibutyl tin mercaptopropionate and 0.15% by weight dibutyl tin maleate; curve 2), dibutyl tin carboxylate (curve 3) and dibutyl tin dithioglycolate (curve 4) are added to the formulation according to the Comparison Example. Although gelation occurs at a later stage in the tin plated steel container, it still takes place after only about 3 weeks to 3 months.

Figure 3:
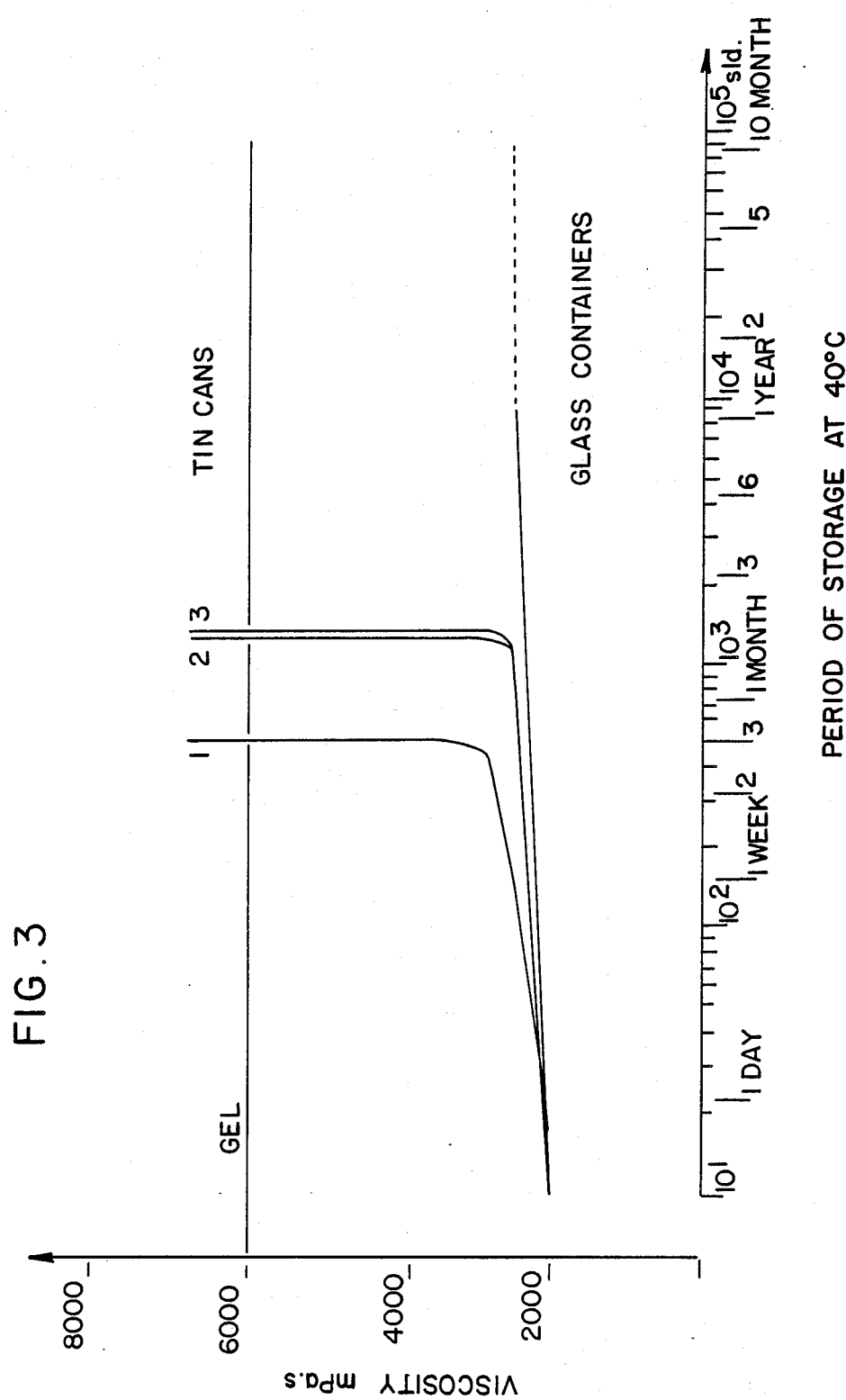
FIG. 3 is a graph showing the change in viscosity of an adhesive containing post-chlorinated PVC stabilized with various concentrations of dibutyl tin carboxylate stored in tin plated steel containers.

The increase obtainable in storage stability depends upon the quantity of corrosion inhibitor used. FIG. 3 shows the increase in stability in the comparison formulation after addition of dibutyl tin carboxylate in quantities of 1 part (curve 1), 2 parts (curve 2) and 3 parts (curve 3) to 100 parts PVC-C. Stabilities of around 2.5 weeks to 2 months were obtained.

Even in the initial phase of gelation, the adhesives show significant changes in flow behavior and unacceptable performance properties. The test results presented show that the corrosion inhibitors mentioned, based on organotin compounds, remain ineffectual because of the inner parts of the container, where unprotected steel is present.

Figure 4:
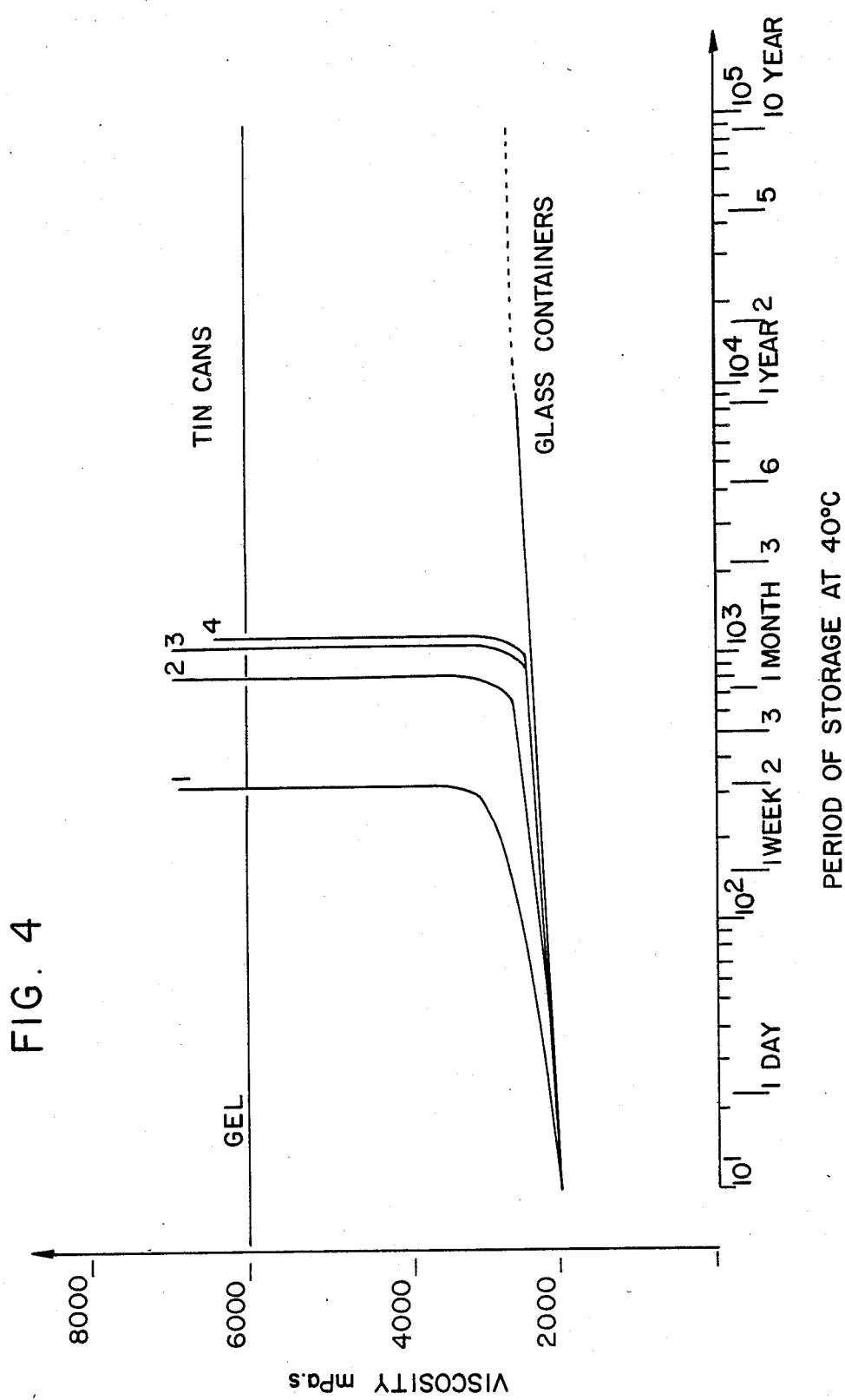
FIG. 4 is a graph showing the change in viscosity of an adhesive containing post-chlorinated PVC stabilized with alkali meal carbonates stored in tin plated steel containers.

FIG. 4 shows that the stability in storage, of adhesives corresponding to the comparison formulation, in tin plated steel containers, cannot be significantly improved even when simple chlorine scavengers, such as ammonium carbonate (curve 1), potassium carbonate (curve 2), sodium carbonate (curve 3) and lithium carbonate (curve 4), are added in quantities of 0.5% by weight; the stability amounted at best to about 1.5 weeks to 2 months.

It is only through the combination according to the invention of organotin compounds and carbonates of ammonia, sodium, potassium and/or lithium that a substantial increase is obtained in the stability in storage, of the comparison formulation in tin plated steel containers. This is apparent from FIG. 5 which shows the stability in storage of a formulation of 100 parts PVC-C, 2 parts dibutyl tin carboxylate and 4 parts potassium carbonate (curve 1), sodium carbonate (straight line 2) or lithium carbonate (straight line 3). The formulation containing potassium carbonate showed a stability of about 8 months while the formulations containing sodium carbonate or lithium carbonate are even better in regard to their stability in storage in tin plated containers, than when stored in glass containers because, basically, glass shows higher solvent diffusion rates.

We claim:

1. A storable adhesive for PVC plastics, comprising a basic mixture of 5 to 30% by weight post-chlorinated PVC and 95 to 70% by weight of an organic solvent, and a stabilizing amount of a combination comprising at least one organotin compound and at least one carbonate selected from the group consisting of ammonium, lithium, sodium and potassium carbonate.

2. A storable adhesive of claim 1, wherein the post-chlorinated PVC, in the basic mixture has a chlorine content of about 65 to about 68% by weight and a K-value of about 50 to about 69.

3. A storable adhesive of claim 1 wherein the organic solvent comprises at least one solvent selected from the group consisting of ketones and cyclic ethers.

4. A storable adhesive of claim 1 wherein the organic solvent comprises at least one solvent selected from the group consisting of tetrahydrofuran, methyl ethyl ketone and cyclohexanone.

5. A storable adhesive of claim 1 wherein the at least one organotin compound is selected from the group consisting of di-n-octyl tin dimercaptide, dibutyl tin dithioesters, di-n-octyl tin dithioglycolate, dibutyl tin dilaurate, di-n-octyl tin maleate, dibutyl tin maleate, dibutyl tin carboxylate and dibutyl tin dithioglycolate.

6. A storable adhesive of claim 1 containing about 1 to about 10% by weight of the stabilizer combination, based on the weight of the post-chlorinated PVC in the adhesive, at a chlorine elimination rate of 5% by weight per year.

7. A storable adhesive of claim 1 wherein the stabilizer combination contains the at least one carbonate and at least one organotin compound in a ratio by weight of about 1.5:1 to about 2.5:1.

8. A storable adhesive of claim 1 containing an effective amount of at last one additive selected from the group consisting of impact modifiers, antioxidants and UV stabilizers.

9. A storable adhesive of claim 2 wherein the organic solvent comprises at least one solvent selected from the group consisting of Ketones and cyclic ethers and the at least one organotin compound is selected from the group consisting of di-n-octyl tin dimercaptide, dibutyl tin dithioesters, di-n-octyl tin dithioglycolate, dibutyl tin dilaurate, di-n-octyl tin maleate, dibutyl tin maleate, dibutyl tin carboxylate and dibutyl tin dtthioglycolate.

* * * * *